(12) United States Patent
Bradt

(10) Patent No.: US 6,354,841 B1
(45) Date of Patent: Mar. 12, 2002

(54) EDUCATIONAL TOY CLOCK

(76) Inventor: W. Lorne Bradt, 27 Fairfield Avenue, Hamilton Ontario (CA), L8H 5G9

( * ) Notice: Subject to any disclaimer, the term of this patent is extended or adjusted under 35 U.S.C. 154(b) by 65 days.

(21) Appl. No.: 09/629,852

(22) Filed: Aug. 1, 2000

(51) Int. Cl.[7] .............................................. G09B 19/12

(52) U.S. Cl. .......................... 434/304; 434/394; 368/45

(58) Field of Search ................................ 434/304, 394; 368/45

(56) References Cited

U.S. PATENT DOCUMENTS

| | | | |
|---|---|---|---|
| 1,245,475 A | | 11/1917 | Lindheim |
| 1,356,929 A | | 10/1920 | Lewers |
| 1,425,264 A | | 8/1922 | Leob |
| 2,853,804 A | | 9/1958 | Bengeyfield |
| D193,659 S | | 9/1962 | Matricardi |
| 3,362,103 A | | 1/1968 | Neumann |
| D219,216 S | | 11/1970 | Speers |
| 3,829,989 A | * | 8/1974 | Pecoraro |
| 3,918,177 A | * | 11/1975 | Capshaw |
| 3,994,078 A | * | 11/1976 | Liu |
| 4,219,943 A | * | 9/1980 | Grimes |
| D268,686 S | | 4/1983 | Wolf |
| D306,611 S | | 3/1990 | Hills |
| D326,297 S | | 5/1992 | Noshiro |
| 5,167,507 A | * | 12/1992 | Cobb |
| D356,742 S | | 3/1995 | Chenwu |
| 5,604,717 A | | 2/1997 | Wang |
| D383,809 S | | 9/1997 | Ekeoba |
| 5,662,479 A | | 9/1997 | Rogers |
| D385,592 S | | 10/1997 | Choi |
| 5,896,349 A | * | 4/1999 | Haze |
| 6,030,228 A | * | 2/2000 | Armstrong |
| 6,278,664 B1 | * | 8/2001 | Huffman |

OTHER PUBLICATIONS

Childcraft Catalogue, Math, p. 136, Judy Clock.
Wintergreen Catalogue, Fun with Wood, p. 266, Lighthouse Clock.
Wintergreen Catalogue, Home Decor Wood Kits, p. 280, Bear Clock.
eToys Online Catalogue, Tic–Tock Answer Clock by Tomy, eToys.
eToys Online Catalogue, Teachin' Time Talking Clock by Playskool.
Tic–Tock Clock Design, by Creativity for Kids, Ace Toys Online Catalogue.
Clock Plans Wall Clocks, Cornerstone Online Catalogue (7 pages).

* cited by examiner

Primary Examiner—Jacob K. Ackun, Jr.
Assistant Examiner—Dmitry Suhol
(74) Attorney, Agent, or Firm—McFadden, Fincham

(57) ABSTRACT

An educational toy clock which has a base with a plurality of spaced apart recesses about the outer periphery thereof reflecting the number positions of a clock face. The base further includes a central recess. A rotatable mounting unit is provided for receipt in the central recess of the base. A pair of clock hands are adapted to be removably mounted in the mounting unit for rotation therewith. A plurality of disc members which cooperate with the bottoms of the recesses are provided, the disc members each having a color and number from 1 to 12. A plurality of dowel members are provided for receipt in the recesses, the dowel members having first and second ends. The first end of each dowel member having a colored surface corresponding to the colors of the disc members; the second end of each of the dowel members having a number from 1 to 12, whereby the first ends of the dowel members can be matched to the color of the disc members in the bottom of the recesses; or the second ends of the dowel members can be matched to the number of the disc members.

15 Claims, 3 Drawing Sheets

EDUCATIONAL TOY CLOCK

FIELD OF THE INVENTION

The present invention relates to an educational toy clock. More specifically, the present invention relates to an educational toy clock which challenges a child to match colors and numbers as well as to learn time.

BACKGROUND OF THE INVENTION

There are a variety of toy clocks and educational toys which are available on the market today. The majority of educational toy clocks on the market serve a single function, to aid in teaching children to recognize and tell time.

U.S. Pat. No. 1,356,929 discloses an educational toy clock which has removable circular blocks which have numerals on both sides. One side of the circular blocks has the Roman numerals with the opposite side of the circular block having the corresponding Arabic characters thereon. The purpose of this clock is for a child to assort the blocks and properly place them in the openings of the base to represent a correct clock dial.

U.S. Pat. No. 1,245,475 teaches an educational toy device which may take the form of a clock face having removable members. The removable members are in the form removable numbers of the clock face which fit into correspondingly shaped recesses.

U.S. Pat. No. 3,362,103 discloses an animated toy clock game including a plurality of removable elements having numerals thereon and a plurality of openings to receive the removable elements. The game includes an animated figure having a head which is operable to indicate approval by nodding in an affirmative manner when a number element is properly positioned within the clock face and to indicate disapproval when a number element is improperly positioned in an opening within the clock face.

U.S. Pat. No. 2,853,804 relates to a time teaching device comprised of a game board with a plurality of recessed areas spaced around a clock face and a plurality of removable numeral-bearing elements adapted to fit within the recesses to aid in teaching children to read time.

None of the prior art clock toys provide for any other educational challenges over and above the teaching of time-telling.

SUMMARY OF THE INVENTION

In accordance with one embodiment of the present invention, there is provided an educational toy clock which includes a base member having a plurality of spaced apart recesses about the outer periphery and a central recess. A rotatable mounting means is provided and adapted for placement in the central recess. A pair of clock hands are removably mounted in the mounting means for rotation therewith. A plurality of disc members received in the bottom of said recesses, each of the disc members having a color and number thereon. The clock further includes a plurality of dowels adapted to be received in the recesses, the dowels having first and second ends with the first end having a colored surface and the second end having a numbered surface. Whereby, in use, the first ends of the dowels can be matched to the colors of the disc members in the bottom of the recesses or alternately, the second ends of the dowels can be matched with the numbers of the disc members.

In accordance with another embodiment of the present invention, there is provided a wooden toy clock comprising: a base unit; a plurality of spaced apart recesses around the outer periphery of the base unit, the recesses having on a bottom surface a color and number from 1 to 12 thereon, each recess having a different color and number; a rotatable mounting means rotatably mounted at a central position of the base unit, the rotatable mounting means comprised of upper and lower housings rotatably mounted together; an hour hand mounted to the lower housing of the mounting means; a minute hand mounted to the upper housing of the mounting means; a plurality of dowels adapted for cooperation with the recesses, each of the dowels having a color on one end matching a color of one of the recesses and having a number from 1 to 12 on the other end; whereby the colors on the one ends of the dowels can be matched with the colors of the recesses and the numbers on the other ends of the dowels can be matched with the numbers of the recesses.

DETAILED DESCRIPTION OF THE INVENTION

Figure 1:
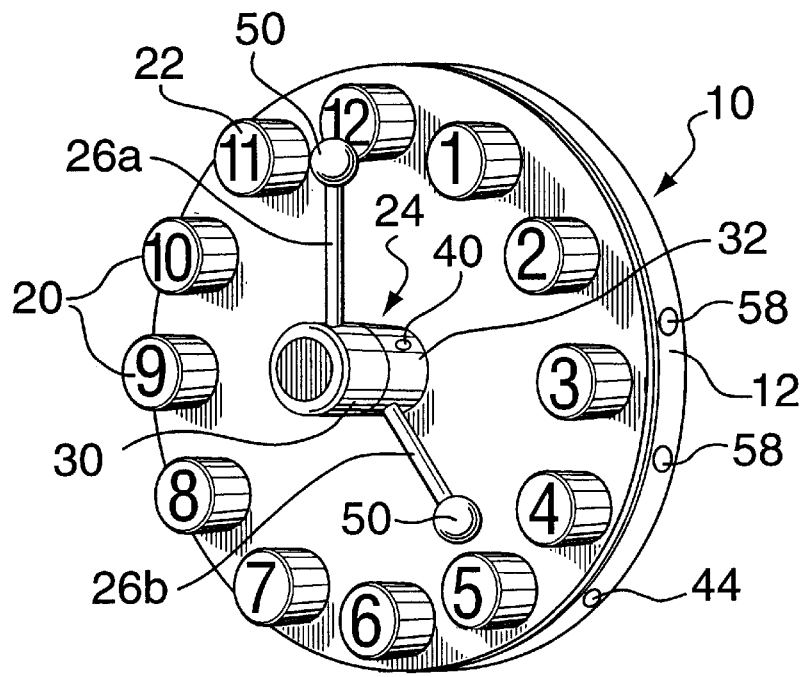
FIG. 1 is a perspective view of the educational toy clock according to the present invention showing the numbered elements in position.
Figure 2:
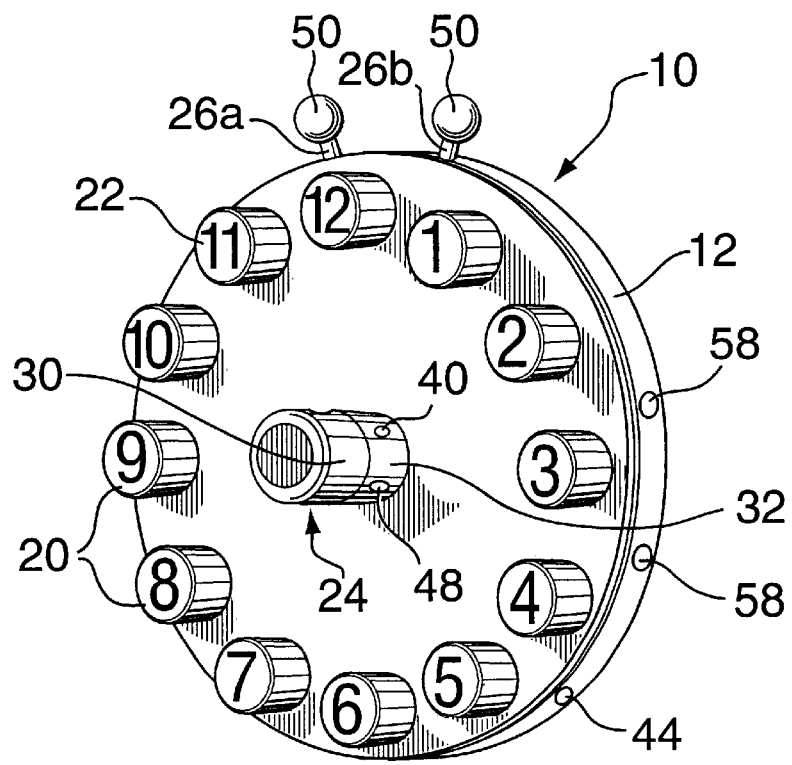
FIG. 2 is a perspective view of the educational toy clock according to the present invention with the hour and minute hands removed for storage.
Figure 3:
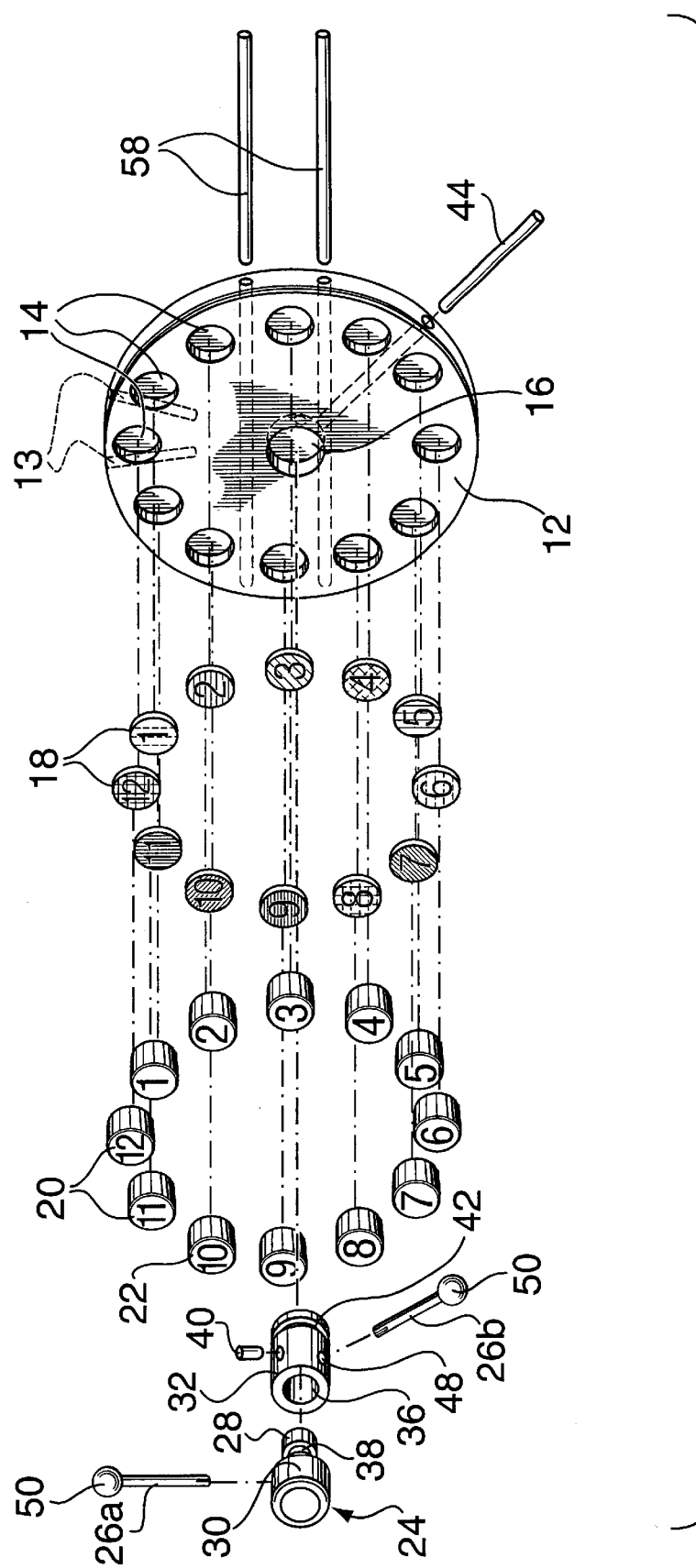
FIG. 3 is an exploded view of the educational toy clock of the present invention.

Referring initially to FIGS. 1 to 3, these figures illustrate the toy clock of the present invention, generally designated by reference numeral 10. The toy clock 10 includes a base member 12. The base member 12 is preferably circular but can be of any other desired shape. It can be of any desired size but in a particularly preferred circular form has a diameter of about 10 inches and a thickness of approximately 2 inches.

Within the base member 12, around the outer periphery thereof, are a plurality of spaced apart recesses 14 and a central recess 16. The spaced apart recesses 14 are twelve in number and are arranged in positions representing the typical positions of the hour numbers about a clock face. The recesses can be of any desired shape or size but, in a preferred form, the recesses are circular and have depth dimension of about 1 inch and a diameter of approximately 1 7/32 inches. The central recess 16 can similarly be of any desired size but in one particularly preferred form is approximately 1 inch deep and has a diameter of approximately 1 9/16 inches.

The base 12 is also provided with slots 13 (see FIG. 3) for storage of clock hands 26a, 26b when not in use. FIG. 2 shows the clock hands 26a, 26b stored. The slots 13 are of a size to receive and maintain the clock hands 26a, 26b therein. Such slots could be from about 2 to about 3½ inches deep. Preferably the slots are oriented on an angle as shown in FIG. 3.

Twelve disc members 18 are provided. These disc members 18 are of a shape and size to fit within the bottom of the recesses 14. Each disc member 18 has a top surface which includes a color thereon; preferably each disc member 18 has a different color. Each of the discs 18 also has, on the same top surface, a single number from 1 to 12, with each disc 18 having a different number. The discs 18 may be affixed to the bottom surface of the recesses by any suitable means and may be affixed in either a permanent manner so that they cannot be easily dislodged therefrom or alternately, if desired, the discs 18 may be affixed in such a way that they are removable from the recesses 14. The discs 18 are of a height dimension smaller than the depth dimension of the recesses 14. Preferably the discs 18 are approximately 1/8 to 1/4 inch thick.

Twelve dowel or plug members 20 are provided. The dowel or plug members are sized and shaped to correspond to the recesses 14 and to thus fit therein. Each dowel member 20 has a first surface 22 having a single number from 1 to 12 thereon, representing the numbers about a clock face. Preferably the numbering on the first surface 22 of each of the dowels 20 is of one color. Each dowel member 20 is provided with a second surface (not shown) which has a color thereon. Each of the dowels 20 having on the second surface a different color, the colors matching the colors on the top surface of the discs 18. The dowel members 20 are preferably of a height dimension larger than the depth dimension of the recesses 14, so that when placed within the recesses 14, they protrude upwardly from the base 12 to provide for easy gripping and removal thereof by a child. Preferably the dowels 20 are approximately 2¾ inches in height and have a diameter of approximately 1¼ inches, although it will be appreciated that other dimensions could be utilized.

The number and colors can be applied directly to the top of the dowels 20 and discs 18 or they could alternatively be in the form of stickers or cut-outs applied to the dowels 20 and discs 18 and affixed by any suitable means, such as by gluing.

Figure 4:
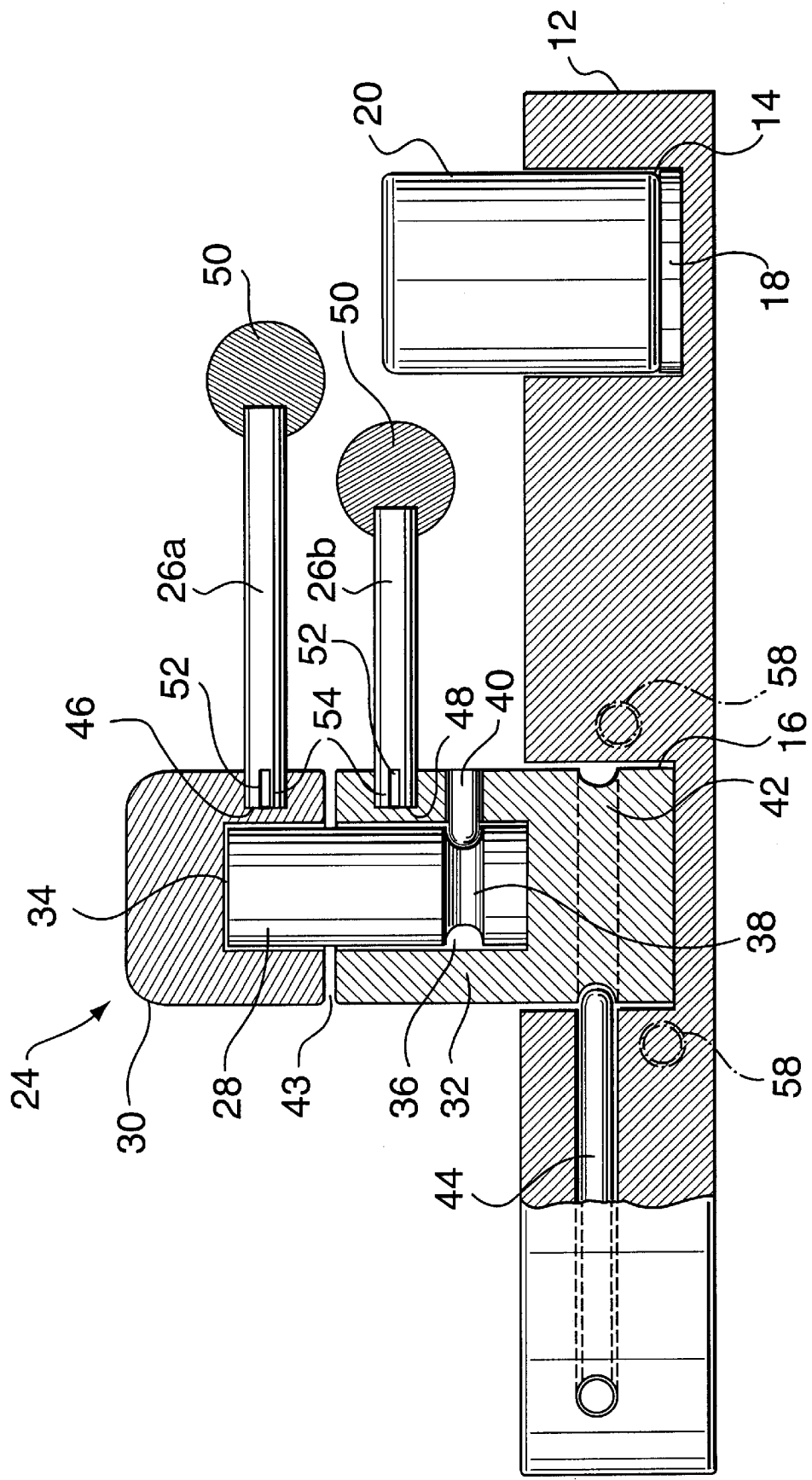
FIG. 4 is a detailed cross-sectional view of the rotatable hand mounting mechanism of the present invention.

The mounting mechanism, generally designated by reference numeral 24, for rotatably mounting the clock hands 26a and 26b (which include both minute hand 26a and hour hand 26b), is shown in FIGS. 1 through 3 as well as in greater detail in FIG. 4. When fully assembled, the mounting mechanism is preferably approximately 3 inches in height and has a diameter of approximately 1½ inches although, it will be understood that any other desired dimensions could be utilized.

The mounting mechanism 24 is mounted within central recess 16 and accordingly, it must be of a suitable diameter to fit within the central recess 16.

The mounting mechanism 24 includes a central rotating shaft 28, an upper housing 30 and a lower housing 32. The central rotating shaft 28, in a preferred embodiment, is permanently affixed, as by gluing or other suitable means, into a central recess 34 of the upper housing 30 and is received in a central recess 36 of the lower housing 32. Optionally, the rotating shaft 28 and the upper housing 30 could be constructed as a single integral unit.

The upper housing 30 and the lower housing 32 are connected to the central rotating shaft 28 in a spaced apart manner, i.e. there is a space 43 between the upper and lower housings 30, 32. Preferably, the space 43 between the upper housing 30 and the lower housing 32 provides for approximately 1/16 inch clearance between the upper and lower housings 30,32.

The central rotating shaft 28 has a concentric groove 38 around a lower section thereof. A hole is provided in the lower section of the lower housing 32 in a position adjacent the concentric groove 38, with a dowel locking pin 40 inserted, and preferably glued, within the hole to a position adjacent the groove portion 38 to prevent the upward movement and thus removal of the rotating shaft 28 from the lower housing 32 while at the same time permitting the rotational movement of the shaft 28 within the lower housing 32 and thus the rotation of the upper housing 30 with respect to the lower housing 32.

The lower housing 32 can also provided with a concentric groove 42 at a lower section thereof. Thus the lower housing 32 can be locked into the base member 12 in a similar manner to that described above. Specifically, a hole is provided through the base member at a position adjacent the groove 42. A locking pin 44 is inserted through the hole in such a manner that it is adjacent the groove 42 to thus prevent the upward movement and thus removal of the lower housing 32 from the base 12. Such an arrangement, although preventing the upward movement and thus removal of the lower housing. 32 at the same time permits the rotational movement of the lower housing 32 with respect to the base 12.

The concentric grooves 38 and 42 are preferably in the form of a ¼ inch ring, having an arcuate profile, cut around the periphery of the rotating shaft 28 and the lower housing 32.

The upper housing 30 has an aperture 46 therein for receiving and releasably maintaining the minute hand 26a. Likewise the lower housing 32 also has an aperture 48 for receiving and releasably maintaining the hour hand 26b.

Each of the clock hands 26a, 26b is provided with a saw cut or groove 52 at one end thereof, this provides for a friction fit of the clock hands 26a, 26b within the holes 46, 48 of the upper and lower housings 30, 32. Thus the groove 52 permits the inward compression of the resulting flanges 54 for a snug friction fit within the holes 46, 48. The clock hands 26a, 26b can be removed from the upper and lower housings 30, 32 through a manual twist and pull action.

The clock hands 26a, 26b further have at their other ends a large rounded ball or knob 50. Preferably the knob 50 is permanently affixed to the end of the clock hands 26a, 26b through gluing. Although the knobs 50 can be of any suitable dimension, in a preferred embodiment the knobs 50 are approximately ¾ inch.

The clock hands 26a, 26b can be made of any suitable material and can be of any desired size and length. In a preferred form, the clock hands 26a, 26b are comprised of short lengths of ¼ inch dowling, with the hour hand 26b preferably being approximately 1 15/16 inches long and the minute hand 26a being approximately 2 9/16 inches long.

With the clock hands 26a, 26b mounted within the upper and lower housings 30, 32, they are thus each individually rotatable with respect to each other and with respect to the base member 12. Preferably, the knob 50 on the end of the minute hand 26a has a clearance, when rotated, of approximately ¼ inch from the top of dowel members 20 inserted in recesses 14 of the base 12. Similarly, the knob 50 of the hour hand 26b, preferably has a clearance, when rotated, of approximately ¼ inch from the inner surface of dowel members 20 and a clearance of approximately ¼ inch from the top surface of the base member 12.

The educational toy clock of this invention can be made of any suitable materials. In a preferred embodiment, the toy clock and its components are comprised of wood. If wood is utilized, one or more reinforcing dowel members 58 (see FIGS. 3 and 4) can be inserted through the base 12 and across the wood grain to reinforce the same. Such dowel members 58 are also preferably glued into place. The purpose of such dowel members 58 is to significantly limit warping of the base and to act as a deterrent for cracking of the wood.

In use, a child could use the toy clock of the present invention to learn time telling, color matching (by matching dowel color to disc color and inserting in appropriate recess) and number matching (matching dowel number to disc number and inserting in appropriate recess). Additionally, a child would gain the basic skills of both color and number recognition as well as the ability to recognize proper number sequence and counting.

Having thus described preferred embodiments of the present invention, it will be understood that various modifications or alterations can be made to the above described embodiments, including changing dimensions of the various components, without departing from the spirit and scope of the invention.

I claim:

1. An educational toy clock comprising:
   a base having a plurality of spaced apart recesses about the outer periphery reflecting the number positions of a clock and a central recess;
   a rotatable mounting means adapted to be received in said central recess;
   a pair of clock hands removably mounted in said mounting means for rotation therewith;
   a plurality of disc members cooperating with said bottom of said recesses, said disc members each having a color and number from 1 to 12;
   a plurality of dowel members adapted to be received in said recesses said dowel members having first and second ends;
   said first end of each of said dowel members having a colored surface corresponding to the colors of said disc members;
   said second end of each of said dowel members having a number from 1 to 12;
   whereby said first ends of dowel members can be matched to the color of said disc members in said bottom of said recesses; or said second en& of said dowel members can be matched to the number of said disc members.

2. The toy clock as defined in claim 1, wherein each of said plurality of disc members has a different colored surface.

3. The toy clock as defined in claim 1, wherein said plurality disc members are permanently affixed to the bottom of said recesses so that said color and number are facing upwardly.

4. The toy clock as defined in claim 1, wherein said mounting means is removable from said central recess.

5. The toy clock as defined in claim 1, wherein said mounting means is permanently affixed to said central recess.

6. The toy clock as defined in claim 1, further including storage means for said cock hands.

7. The toy clock as defined claim 6, wherein said storage means is a pair of elongated angled slots though the top of said base which receive said hands.

8. The toy clock as defined claim 1, wherein said mounting means is comprised of an upper housing and a lower housing, said upper housing and lower housing rotatably mounted together through a central shaft.

9. The toy clock as defined in claim S, wherein said upper housing has a central aperture, said central shaft permanently affixed within said central aperture of said upper housing.

10. The toy clock as defined in claim 8, wherein said upper housing and said central shaft are a single integral unit.

11. The toy clock as defined in claim 1, wherein said mounting means is rotatably mounted within the central recess of said base to permit rotation of said mounting means with respect to said base.

12. A wooden toy clock comprising:
   a base unit;
   a plurality of spaced apart recesses around the outer periphery of said base unit, said recesses having on a bottom surge a color and number from 1 to 12 thereon, each recess having a different color and number;
   a rotatable mounting means rotatably mounted at a central position of said base unit, said rotatable mounting means comprised of upper and lower housings rotatably mounted together,
   an hour hand mounted to said lower housing of said mounting means;
   a minute hand mounted to said upper housing of said mounting means;
   a plurality of dowels adapted for cooperation with said recess, each of said dowels having a color on one end matching a color of one of said recesses and having a number from 1 to 12 on the other end;
   whereby the colors on one ends of said dowels can be matched with the colors of the recesses and the numbers on the other ends of said dowels can be matched with the numbers of said recesses.

13. The wood clock according to claim 12, wherein said upper and lower housing of said mounting means are rotatably mounted together through a central shaft.

14. The toy clock as defined in claim 12, further including storage means for said clock hands.

15. The toy clock as defined in claim 14, wherein said storage means is a pair of elongated angled slots through the top of said base which receive said hands.

* * * * *